United States Patent [19]

Häuser

[11] 3,764,615
[45] Oct. 9, 1973

[54] PROCESS FOR THE PREPARATION OF PREGNANE DERIVATIVES
[75] Inventor: Helmut Häuser, Unna, Germany
[73] Assignee: Schering Aktiengesellschaft, Berlin, Germany
[22] Filed: Aug. 1, 1972
[21] Appl. No.: 277,123

[30] Foreign Application Priority Data
Aug. 6, 1971  Germany.................. P 21 40 291.5
June 16, 1972  Germany.................. P 22 30 286.9

[52] U.S. Cl.......................... 260/397.4, 260/397.45
[51] Int. Cl........................................... C07c 167/20
[58] Field of Search... Machine Searched Steroids Primary Examiner—Henry A. French
Attorney—I. William Millen et al.

[57] ABSTRACT
Pregnane steroids having the partial formula

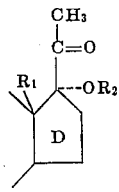

wherein $R_1$ is methyl or ethyl and $R_2$ is hydrocarbon or acyl, are produced by reacting a steroid sulfite ester of the partial formula

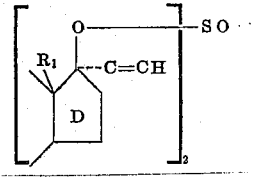

wherein $R_1$ has the values given above, with an alcohol or a carboxylic acid, in the presence of a water-binding agent and a mercury salt. The thus-produced 17-ether or 17-ester respectively, of the alcohol or acid employed in the reaction can, if desired, by hydrolyzed to obtain the 17-hydroxy compound otherwise corresponding to Formula I wherein $R_2$ is a hydrogen atom.

12 Claims, No Drawings

PROCESS FOR THE PREPARATION OF PREGNANE DERIVATIVES

BACKGROUND OF THE INVENTION

This invention relates to a novel process for the production of pregnane-20-ones.

The process of this invention is a method for the construction of pregnane side chains in steroids. Such methods are known. See J. Amer. Chem. Soc. 89, 1967, 5505, as well as J. Org. Chem. 33, (1968), 3294. However, these methods are not suitable for the production of pregnane steroids on a commercial scale, partially because too many steps are required for the construction of the pregnane side chain, and partially because the individual reaction steps are too expensive.

SUMMARY OF THE INVENTION

According to this invention, 17-ethers or 17-esters of 17α-hydroxy-17β-acetyl steroids are produced by reacting a bis sulfite ester of a 17α-ethinyl-17β-hydroxy steroid having an otherwise unsubstituted D-ring and optionally a methyl or ethyl group at the 16-position, with an alcohol or a carboxylic acid, respectively, in the presence of a water binding agent and a mercury salt. Optionally, the thus-produced ether or ester can then be cleaved by conventional methods to produce the corresponding free 17α-hydroxy steroid. Thus, pregnane steroids of the partial general formula I

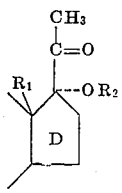

I wherein $R_1$ is methyl or ethyl and $R_2$ is a hydrogen atom, hydrocarbon or acyl can be produced from steroid of the partial general formula II

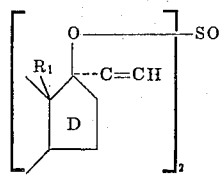

II wherein $R_1$ has the values given above, with an alcohol or a carboxylic acid, in the presence of a water-binding agent and a mercury salt. The thus-produced 17-ether or 17-ester respectively, of the alcohol or acid employed in the reaction can, if desired, be hydrolyzed to obtain the 17-hydroxy compound otherwise corresponding to Formula I wherein $R_2$ is a hydrogen atom

DETAILED DISCUSSION

The course of the reaction of this invention is surprising. Although it was known to those skilled in the art that the corresponding ketones can be produced by the reaction of an acetylene compound with water, alcohols or acids in the presence of mercury salts, it could not be foreseen that the hydroxyl group in the 17β-position and the side chain in the 17α-position of the steroid sulfite esters of Partial Formula II would experience inversion during the course of the reaction, and the desired pregnane derivatives with a β-positioned side chain would be formed.

Preferred hydrocarbon $R_2$ groups of products of Partial Formula I are alkyl of 1 to 4 carbon atoms, which can be substituted by a phenyl group; e.g., methyl, ethyl, n-propyl, n-butyl and benzyl. Preferred acyl $R_2$ groups are those of carboxylic acids of one to eight carbon atoms, e.g., formyl, acetyl, monofluoroacetyl, trifluoroacetyl, propionyl, butyryl, valeryl, hexanoyl and benzoyl.

The starting steroid sulfite esters of general Partial Formula II utilized as the starting materials for the process of this invention can be an ester of any 17β-hydroxy steroid as defined herein, e.g., of the estrane, androstane, and etiochiolane series. These steroids can be substituted in the usual manner. Examples of such substituents are one or more of free, etherified and esterified hydroxy groups, e.g., in the 1-, 3-, 6-, or 11-position; blocked and free keto groups, e.g., in the 3- or 11-position, fluorine atoms, e.g., in the 2-, 4-, 6-, or 9-position, methyl groups, e.g., in the 1-, 2-, or 6-position or methylene groups, e.g., in the 1,2α-, 5,10β-, or 6,7α-position, and double bonds, e.g., in the 1-, 3-, 4-, 5(6)-, 5(10)-, or 9(11)-position. For example, the starting compounds of Partial Formula II can have a Δ¹-monoene, a Δ¹,⁴-diene or an aromatic A-ring. Other examples of substituents which can be present are epoxy, chloro, bromo and cyano. The angular methyl group at the 10 position can be absent the steroid, can be a dl racemate or either enantomer.

Since the process of this invention is preferably utilized as part of a total steroid synthesis, preferred starting steroids for this process are those steroid sulfite esters of general Formula II which can, in turn, be readily prepared by total synthesis. Such esters are, in particular, steroid sulfite esters of the general Formula III

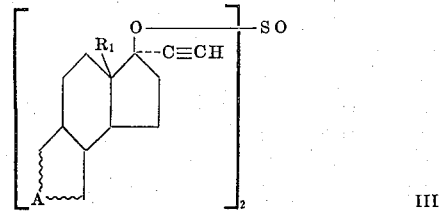

III wherein $R_1$ is methyl or ethyl and A is

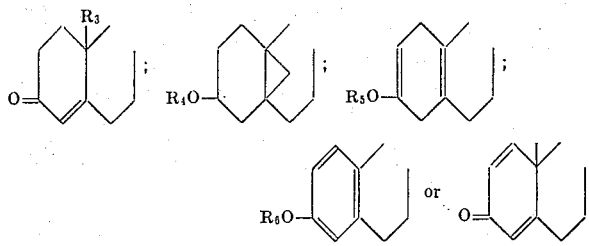

in which $R_3$ is a hydrogen atom or methyl, $R_4$ and $R_6$ each are a hydrogen atom, alkyl or acyl and $R_5$ is alkyl.

In the compounds of Formula III, the $R_4$, $R_5$ and $R_6$ alkyl groups can be any straight or branched chain alkyl group, e.g., of one to eight carbon atoms, optionally substituted by hydrocarbon aryl. Preferred are alkyl of one to four carbon atoms, optionally substituted by phenyl, e.g., methyl, ethyl and benzyl.

In the compounds of Formula III, $R_4$ and $R_6$, when acyl, can be the acyl group of any saturated or unsaturated aliphatic, cycloaliphatic, aromatic, or heterocyclic, substituted or unsubstituted carboxylic or sulfonic acid containing a total of one to ten carbon atoms, inclusive. Preferred carboxylic acid acyl groups are those of fatty acids of one to 10, preferably one to seven carbon atoms, e.g., formic acid, acetic acid, propionic acid, butyric acid, isobutyric acid, the valeric acids, e.g., n-valeric acid and trimethylacetic acid, the caproic acids, e.g., n-caproic acid, tert.-butylacetic acid, or diethylacetic acid, the enanthic, caprylic and capric acid. Examples of other carboxylic acids are cyclopropyl-, cyclobutyl-, cyclopentyl-, and cyclo-hexylcarboxylic acid, cyclopropylacetic acid, cyclobutylacetic acid, the cyclopentyl-, cyclohexyl-, aryl-acetic acids and -propionic acids, e.g., phenylacetic acid, 3-phenylpropionic acid, 3-cyclopentylpropionic acid, or 3-cyclohexylpropionic acid, benzoic acid, p-nitrobenzoic acid, adamantane-1-carboxylic acid, phenoxyalkanoic acids, such as phenoxyacetic acid, halocarboxylic acids, e.g., chloroacetic acid, 2-chloropropionic acid, p-chlorophenoxyacetic acid, 2,4-dichlorophenoxyacetic acid, ether acids, e.g., 4-tert.-butyl-phenoxyacetic acid, 3-phenoxypropionic acid, 4-phenoxybutyric acid; heterocyclic acids, e.g., furan-2-carboxylic acid, 5-tert.-butyl-furan-2-carboxylic acid, 5-bromofuran-2-carboxylic acid, picolinic acid, nicotinic acid or isonicotinic acid, β-ketocarboxylic acids, e.g., acetoacetic acid, propionylacetic acid and butyrylacetic acid.

Preferred sulfonic acid esters are esters of alkylsulfonic acids of one to six carbon atoms, inclusive, e.g., methanesulfonic acid and ethanesulfonic acid, and of arylsulfonic acids of six to 10 carbon atoms, inclusive, e.g., benzene-, p-toluene-, and 1-, and 2-naphthalene-sulfonic acid.

Preferred $R_4$ and $R_6$ acyl groups are those of carboxylic acids of one to eight carbon atoms, e.g., alkanoic and carbocyclic aryl, including formyl, acetyl, propionyl and butyryl, and benzoyl.

The alcohols and carboxylic acids which can be employed in this invention can vary widely in structure. As a general rule they are of a relatively low molecular weight, e.g., less than 100. They preferably are monofunctional, i.e., they contain no reactive group other than a single alcoholic hydroxy or carboxylic acid group. Examples of such carboxylic acids are listed above in the definition of $R_4$ and $R_6$.

Preferred carboxylic acids are those having a dissociation constant at 25° C. of at least $1 \times 10^{-5}$. Especially preferred are those containing one to eight carbon atoms, e.g., formic, acetic, monofluoroacetic, trifluoroacetic, propionic, butyric, valeric, hexanoic and benzoic acids, most preferably formic and acetic acid.

Preferred alcohols are those containing one to eight, more preferably one to four carbon atoms, especially the alkanols and particularly the straight chain alkanols, which can be substituted by a hydrocarbon aryl group, e.g., methanol, ethanol, n-propanol, n-butanol and benzyl alcohol, most preferably methanol.

In carrying out the process of this invention, a steroid sulfite ester of general Partial Formula II is reacted with an alcohol or carboxylic acid in the presence of a water-binding agent and a mercury salt.

Examples of the starting compounds of Formula III are:

bis (3-oxo-17α-ethinyl-4-estren-17-β-yl) sulfite,
bis (3-oxo-17α-ethinyl-4-androsten-17-β-yl) sulfite,
bis (3-oxo-18-methyl-17α-ethinyl-4-estren-17-β-yl) sulfite,
bis (3-oxo-18-methyl-17α-ethinyl-4-androsten-17-β-yl) sulfite,
bis (3β-acetoxy-18-methyl-17α-ethinyl-5β,19-cycloandrostan-17β-yl) sulfite,
bis (3β-methoxy-17α-ethinyl-5β,19-cycloandrostan-17β-yl) sulfite,
bis (3-acetoxy-17α-ethinyl 2,5(10)-estradien-17β-yl) sulfite,
bis (3-acetoxy-18-methyl-17α-ethinyl 2,5(10)-estradien-17β-yl) sulfite,
bis (3-acetoxy-17α-ethinyl 1,3,5(10)-estratrien-17β-yl) sulfite,
bis (3-acetoxy-1α-methyl-17α-ethinyl 1,3,5(10)-estratrien-17β-yl) sulfite,
bis (3-oxo-17α-ethinyl-1,4-androstadien-17β-yl) sulfite, and
bis (3-oxo-18-methyl-17α-ethinyl-1,4-androstadien-17β-yl) sulfite.

Particularly suitable as mercury salts are those which are at least sparingly soluble, e.g., at least 0.01 %, in the reaction mixture. Especially suitable are mercury salts of organic carboxylic acids, e.g., an acid named above in the definition of $R_4$ and $R_6$. Preferred are mercury salts of alkanoic acids of one to eight carbon atoms, e.g., mercury (I) formate, mercury (I) acetate, mercury (II) formate and mercury (II) acetate. When a carboxylic acid is employed in the process of this invention, to produce a compound of Formula I wherein $R_2$ is acyl, the mercury (II) salts can be produced by reacting mercury (II) oxide in situ with the carboxylic acid employed.

Water-binding agents which can be employed in the process of this invention include both dessicants, i.e., those which physically adsorb water, and water-reactive compounds, i.e., those which react chemically with water. The exact mode of water-binding is not critical, since the role of the water-binding agent is to remove water from the reaction mixture so that the reaction can continue to completion. Thus, the water-binding agents which can be employed include such diverse compounds as inert water-binding inorganic salts and high-molecular weight organic compounds. Suitable dessicant water-binding agents include anhydrous calcium sulfate, highly active silica gel, aluminum oxide and molecular sieves. Preferred are water-reactive organic water-binding compounds, especially carboxylic acid derivatives or carbonic acid derivatives having a very reactive C—O or C—N bond, i.e., reactive toward water, e.g., activated urea derivatives, isocyanates, carbodiimides, carboxylic acid anhydrides, orthoformic acid esters, enol esters, ketene acetates and ketenes. Specific examples are n-butyl isocyanate, n-hexyl isocyanate, phenyl isocyanate, N,N-carbonyl diimidazole, N,N-diisopropyl carbodiimide, N,N-dicyclohexyl carbodiimide, ketene, acetic anhydride, propionic anhydride, trifluoroacetic anhydride, orthoformic acid trimethyl ester and isopropenyl acetate. Since the carboxylic acid anhydrides, enol esters, and ketenes react with alcohols, obviously these compounds can be employed as water-binding agents only when reacting the sulfite esters of Formula II with a carboxylic acid. The orthoformic acid esters are preferably utilized only when reacting the sulfite esters with alcohols.

The reaction mixture can also comprise an inert solvent, e.g., one which acts as a solubilizer for the mercury salt employed. Examples of suitable solvents are dipolar aprotic solvents, e.g., dimethylformamide, dimethylacetamide, dimethyl sulfoxide, hexamethylphosphoric triamide, sulfolane and N-methylpyrrolidone.

The process of this invention can be conducted at room temperature or at reduced or elevated temperatures. Preferably, a temperature of from 0° to 100° C. is utilized.

The ratio of alcohol or carboxylic acid, of water-binding agent and of mercury salt to the starting steroid sulfite ester and to each other is not critical. Optionally, 0.1 to 2 moles of the mercury salt, 0.5 to 5 moles of the water binding agent and 5 to 250 moles of the alcohol or carboxylic acid may be used for one mol of the steroid sulfite ester.

The optional splitting of the 17-esters and 17-ethers, produced as products of the process of this invention is effected in accordance with conventional methods known in the literature.

The preparation of the 17α-hydroxy steroids of general Formula I is accomplished especially advantageously by reacting the sulfite esters of Formula II with a lower carboxylic acid, e.g., formic acid or acetic acid, and then hydrolyzing the thus-formed ester by means of acidic or basic saponification methods. In this hydrolysis, any 3β-acyloxy groups or 3-enol ether groups which may be present in the steroid can also be split. For example, using formic acid, the very readily hydrolyzable esters of this acid are produced which can be completely hydrolyzed during the working-up of the reaction mixture by conducting the working-up procedure in an acidic or basic solution.

The starting steroids of general Partial Formula II for the process of the present invention can be prepared by reacting the corresponding 17β-hydroxy-17α-ethinyl steroids with pyridine and thionyl chloride at a reaction temperature of about −20° C. to −60° C. This reaction is preferably conducted in a suitable solvent, e.g., methylene chloride, chloroform, dioxane, tetrahydrofuran and benzene.

Since it is possible, by the process of this invention, to produce pregnane derivatives from 17-oxoandrostanes and 17-oxoestranes by a three-step synthesis which is easily conducted on a technical scale, the present process is especially a valuable contribution to the total synthesis of pregnane compounds, e.g., gestagenically effective 17α-hydroxyprogesterone derivatives, such as 17α-hydroxyprogesterone caproate or 6-chloro-17α-acetoxy-4,6-pregnadiene-3,20-dione, and antiphlogistically effective corticoids, e.g., hydrocortisone, prednisolone, triamcinolone and dexamethasone.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. 50 g. of 17β-hydroxy-17α-ethinyl-4-estren-3-one is dissolved in 250 ml. of absolute tetrahydrofuran and 250 ml. of pyridine. The solution is cooled to −30° C. and 50 ml. of thionyl chloride in 50 ml. of absolute tetrahydrofuran is gradually added dropwise. After 3 hours at −30° C., the reaction product is poured into 8 liters of ice-cold aqueous 1 percent strength hydrochloric acid and then taken up in methylene chloride. The organic phase is washed successively in dilute hydrochloric acid, water, aqueous sodium bicarbonate solution, and water; dried with sodium sulfate; and concentrated to dryness under vacuum. The residue is taken up in 800 ml. of dioxane, mixed with 1.6 l. of hexane, and agitated for 2 hours. The thus-obtained product is filtered off, dried, and 54.8 g. of bis(3-oxo-17α-ethinyl-4-estren-17β-yl)sulfite is thus obtained, m.p. 121°–123° C.

b. 42.5 ml. of hexamethylphosphoric triamide is mixed with 100 ml. of formic acid and 30 g. of N,N-dicyclohexyl carbodiimide; during this step, the mixture heats up to about 35° C. At this temperature, 10.0 g. of bis(3-oxo-17α-ethinyl-4-estren-17β-yl)-sulfite and 1.67 g. of mercury(II) acetate are added, and the mixture is agitated for 90 minutes at 40° C.

The reaction mixture is then poured into 2 l. of ice water containing 2 g. of sodium sulfide and 80 g. of sodium bicarbonate, extracted with benzene, the benzene phase filtered, washed several times with water, dried over sodium sulfate, and concentrated under vacuum. The residue is digested with 15 ml. of methanol, thus obtaining 8.2 g. of 17α-formyloxy-19-nor-4-pregnene-3,20-dione, m.p. 195°–197° C.

EXAMPLE 2

8.5 g. of 17α-formyloxy-19-nor-4-pregnene-3,20-dione is heated with 200 ml. of methanol and 5 ml. of concentrated hydrochloric acid for 5 minutes to the boiling point. Then, the mixture is allowed to cool, neutralized with aqueous sodium carbonate solution, and concentrated under vacuum. The residue is taken up in water and methylene chloride, the methylene chloride phase is concentrated under vacuum, and the residue is recrystallized from methanol, thus obtaining 7.6 g. of 17α-hydroxy-19-nor-4-pregnene-3,20-dione, m.p. 199°–201° C.

EXAMPLE 3

16.0 g. of N,N-dicyclohexyl carbodiimide is mixed, under a nitrogen atmosphere and under cooling, with 42.5 ml. of hexamethylphosphoric triamide and 50 ml. of formic acid. The mixture is cooled to 0° C., mixed with 10.0 g. of bis(3-oxo-17α-ethinyl-4-estren-17β-yl)sulfite and 1.6 g. of mercury acetate, and agitated for 3 hours at room temperature.

Thereafter, the reaction mixture is poured into 2 l. of ice water containing 2 g. of sodium sulfide and 80 g. of sodium bicarbonate, extracted with benzene, the benzene phase is filtered, dried over sodium sulfate, and concentrated under vacuum. The thus-obtained residue is taken up in 20 ml. of methanol, mixed with 0.5 ml. of concentrated hydrochloric acid, heated to the boiling point for 5 minutes, and poured into 200 ml. of ice water. The mixture is stirred for several hours at room temperature; the thus-separated product is filtered off, digested with 15 ml. of methanol, and 7.5 g. of 17α-hydroxy-19-nor-4-pregnene-3,20-dione is thus produced, m.p. 202°–204° C.

EXAMPLE 4

3.15 g. of bis(3-oxo-17α-ethinyl-4-estren-17β-yl)-sulfite is mixed with 100 ml. of dimethylformamide, 15 ml. of formic acid, 5 g. of mercury(II) acetate, and 10 g. of phenyl isocyanate and agitated at room temperature for 3 hours.

Then, the reaction mixture is poured into 1 liter of ice water containing 1 g. of sodium sulfide and 40 g. of sodium bicarbonate, extracted with benzene, the benzene phase washed with water, dried over sodium sulfate, and concentrated under vacuum. The residue is purified by means of preparative thin-layer chromatography, thus obtaining 1.7 g. of 17α-formyloxy-19-nor-4-pregnene-3,20-dione, m.p. 195°–197° C.

EXAMPLE 5

A mixture of 100 ml. of acetic anhydride, 300 ml. of absolute dimethylformamide, and 30 ml. of formic acid is cooled to +10° C., mixed with 6.3 g. of bis(3-oxo-17α-ethinyl-4-estren-17β-yl)sulfite and 5.0 g. of mercury(II) acetate, and stirred for 3 hours at +10° C.

The reaction mixture is worked up as described in Example 1b, thus producing 3.4 g. of 17α-formyloxy-19-nor-4-pregnene-3,20dione, m.p. 193°–197° C.

EXAMPLE 6

A mixture of 100 ml. of acetic anhydride, 300 ml. of absolute dimethylformamide, and 30 ml. of acetic acid is cooled to +10° C., mixed with 6.3 g. of bis(3-oxo-17α-ethinyl-4-estren-17β-yl)sulfite and 5.0 g. of mercury (II) acetate, and stirred for 3 hours at +10° C.

The reaction mixture is worked up as described in Example 1(b), thus obtaining 2.7 g. of 17α-acetoxy-19-nor-4-pregnene-3,20-dione, m.p. 217°–220° C.

EXAMPLE 7

2.0 g. of bis(3-oxo-17α-ethinyl-4-estren-17β-yl)sulfite is mixed with 2 l. of absolute methanol, 1.6 g. of mercury(II) acetate, and 6 g. of neutral activated aluminum oxide, and agitated for 3 hours at room temperature.

Thereafter, the reaction mixture is mixed with a solution of 1.6 g. of sodium sulfide in 10 ml. of water, neutralized with acetic acid, and filtered. Then, the solution is mixed with 10 ml. of 2N hydrochloric acid and extensively concentrated under vacuum. The remaining residue is mixed with water, extracted with methylene chloride, and the methylene chloride extract is washed with water and concentrated; the thus-obtained crude product is purified by recrystallization from acetone-hexane, resulting in 1.6 g. of 17α-methoxy-19-nor-4-pregnene-3,20-dione, m.p. 158°–160° C.

EXAMPLE 8

17β-Hydroxy-17α-ethinyl-4-androsten-3-one is reacted as described in Example 1(a), yielding bis(3-oxo-17α-ethinyl-4-androsten-17β-yl)sulfite, m.p. 203°–204° C. (decomposition).

10 g. of bis(3-oxo-17α-ethinyl-4-androsten-17β-yl)sulfite is reacted as set forth in Example 3, thus obtaining 7.2 g. of 17α-hydroxy-4-pregnene-3,20-dione, m.p. 208°–210° C.

EXAMPLE 9

17β-Hydroxy-18-methyl-17α-ethinyl-4-androsten-3-one is reacted as described in Example 1(a), thus obtaining bis(3-oxo-18-methyl-17α-ethinyl-4-androsten-17β-yl)sulfite.

10 g. of bis(3-oxo-18-methyl-17α-ethinyl-4-androsten-17β-yl)sulfite and 1.6 g. of mercury(II) acetate are introduced into a mixture of 10.0 g. of dicyclohexyl carbodiimide, 50 ml. of hexamethylphosphoric triamide, and 60 ml. of formic acid and agitated for 6 hours. After working up the reaction mixture as set forth in Example 3, 6.5 g. of 17α-hydroxy-18-methyl-4-pregnene-3,20-dione is obtained, m.p. 229°–231° C.

EXAMPLE 10

17β-Hydroxy-18-methyl-17α-ethinyl-4-estren-3-one is reacted as disclosed in Example 1(a), thus obtaining bis(3-oxo-18-methyl-17α-ethinyl-4-estren-17β-yl)sulfite, m.p. 159°–161° C.

5.0 g. of bis(3-oxo-18-methyl-17α-ethinyl-4-estren-17β-yl)sulfite is reacted as described in Example 9, resulting in 3.4 g. of 17α-hydroxy-18-methyl-19-nor-4-pregnene-3,20-dione, m.p. 216°–218° C.

EXAMPLE 11

3β-Acetoxy-18-methyl-17α-ethinyl-5β,19-cycloandrostan-17β-ol is reacted as disclosed in Example 1(a), thus obtaining bis(3β-acetoxy-18-methyl-17α-ethinyl-5β,19-cycloandrostan-17β-yl)sulfite, m.p. 178°–180° C.

4.2 g. of bis(3β-acetoxy-18-methyl-17α-ethinyl-5β,19-cycloandrostan-17β-yl)sulfite is introduced into a mixture of 10.0 g. of neutral activated aluminum oxide, 1.1 g. of mercury(II) acetate, 20 ml. of hexamethylphosphoric triamide, and 20 ml. of formic acid and stirred for 3 hours at 40° C.

Thereafter, the aluminum oxide is filtered off, the reaction mixture is worked up as described in Example 1(b), and 3.1 g. of 17α-formyloxy-3β-acetoxy-18-methyl-5β,19-cyclopregnan-20-one is produced, m.p. 225°–229° C.

3.1 g. of 17α-formyloxy-3β-acetoxy-18-methyl-5β,19-cyclopregnan-20-one is saponified as described in Example 2, thus obtaining 2.4 g. of 3β,17α-dihydroxy-18-methyl-5β,19-cyclopregnan-20-one, m.p. 237°–242° C.

EXAMPLE 12

17β-Hydroxy-17α-ethinyl-4,9(11)-androstadien-3-one is reacted as set forth in Example 1(a), thus producing bis(3-oxo-17α-ethinyl-4,9(11)-androstadien-17β-yl)sulfite.

3.0 g. of bis(3-oxo-17α-ethinyl-4,9(11)-androstadien-17β-yl)sulfite and 3.0 g. of mercury(II) acetate are introduced into a mixture of 4.0 g. of dicyclohexyl carbodiimide, 15 ml. of formic acid, and 20 ml. of acetone and stirred for 3 hours at room temperature.

The reaction mixture is worked up as described in Example 3, thus producing 2.1 g. of 17α-hydroxy-4,9(11)-pregnadiene-3,20-dione, m.p. 214°–216° C.

EXAMPLE 13

3-Acetoxy-17α-ethinyl-1,3,5(10)-estratrien-17β-ol is reacted as described in Example 1(a), thus obtaining bis(3-acetoxy-17α-ethinyl-1,3,5(10)-estratrien-17β-yl)sulfite, m.p. 184°–186° C.

5.0 g. of bis(3-acetoxy-17α-ethinyl-1,3,5(10)-estratrien-17β-yl)sulfite and 5.0 g. of mercury (II) acetate are added to a mixture of 20 ml. of formic acid, 10 ml. of isopropenyl acetate, and 30 ml. of dimethylformamide and stirred for 3 hours at 40° C.

The reaction mixture is worked up as indicated in Example 3, thus obtaining 3.1 g. of 3,17β-dihydroxy-19-nor-1,3,5(10)-pregnatrien-20-one, m.p. 240°–242° C.

EXAMPLE 14

5.0 g. of bis(3-oxo-17α-ethinyl-4-estren-17β-yl)sulfite is mixed with 5.0 g. of dicyclohexyl carbodiimide, 12.5 ml. of hexamethylphosphoric triamide, and 2.6 g. of freshly prepared mercury(I) formate. Then, 12.5 ml. of anhydrous formic acid is added dropwise to the reaction mixture within 30 minutes, with intermittent cooling with water, at a rate such that the reaction temperature does not fall below 50° C. After 3 hours, the mixture is poured into 300 ml. of saturated sodium chloride solution containing 1.6 g. of sodium disulfide hydrate. The reaction mixture is filtered, the residue washed with water and extracted with benzene. From the benzene phase, by evaporation under vacuum, 4.5 g. of a crude product is obtained having the $[\alpha]_D$ value of $+ 27.2°$, which contains, according to analysis by gas chromatography, 50% 17α-formyloxy-19-nor-4-pregnene-3,20-dione and 15% 17α-hydroxy-19-nor-4-pregnene-3,20-dione.

EXAMPLE 15

5.0 of bis(3-oxo-17α-ethinyl-4-estren-17β-yl)sulfite is made into a slurry in 25 ml. of hexamethylphosphoric triamide and mixed with 2.6 g. of mercury(I) acetate. Then, 25 ml. of 98% strength formic acid is added dropwise under cooling, and 5.0 g. of dicyclohexyl carbodiimide is admixed thereto; the reaction mixture is allowed to stand for 2 hours at room temperature and worked up as described in Example 14, thus producing 5.0 g. of a crude product which is washed with methanol and yields 3.1 g. of 17α-formyloxy-19-nor-4-pregnene-3,20-dione, m.p. 195°–197° C.

EXAMPLE 16

5.0 g. of bis(3-oxo-17α-ethinyl-4-estren-17β-yl)-sulfite is reacted analogously to Example 15, but an equal amount of mercury(II) acetate is added to the disclosed amount of mercury(I) acetate, thus yielding 4.0 g. of 17α-formyloxy-19-nor-4-pregnene-3,20-dione, m.p. 194°–197° C.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of 17-ethers and 17 esters of a 17α-hydroxy-17β-acetyl steroid which comprises reacting a bis sulfite ester of a 17α-ethinyl-17β-hydroxy steroid of the partial formula

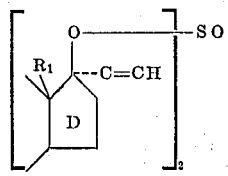

wherein $R_1$ is methyl or ethyl, or the corresponding steroid having a methyl or ethyl group in the 16-position, with a monofunctional primary alcohol or a monofunctional carboxylic acid, respectively, each having a molecular weight of less than 100, in the presence of a water binding agent which physically adsorbs or reacts with the water formed in the reaction and a mercury salt which is at least sparingly soluble in the reaction mixture.

2. A process according to claim 1, wherein the starting steroid is a sulfite ester of the formula

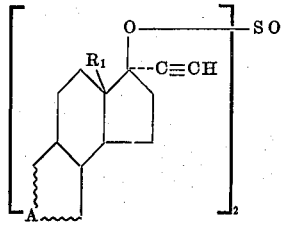

wherein $R_1$ is methyl or ethyl and A is one of the groups

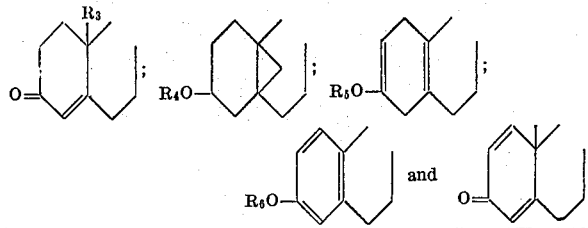

wherein $R_3$ is a hydrogen atom or methyl, $R_4$ and $R_6$ are each a hydrogen atom, alkyl or acyl and $R_5$ is alkyl.

3. A process according to claim 1 wherein the starting sulfite ester is reacted with formic acid, acetic acid or methanol.

4. A process according to claim 1 wherein the water-binding agent is a carboxylic or carbonic acid derivative having an active —C—O— or C—N— bond.

5. A process according to claim 4 wherein the water-binding agent is an isocyanate, a carbodiimide, carbonyl diimidazole, a carboxylic acid anhydride, an orthoformic acid ester, an enol ester or a ketene.

6. A process according to claim 1 wherein the water-binding agent is activated aluminum oxide.

7. A process according to claim 1 wherein a mercury (II) salt is employed.

8. A process according to claim 7, wherein the mercury salt is mercury (II) formate or mercury (II) acetate.

9. A process according to claim 1 wherein a mercury (I) salt is employed.

10. A process according to claim 9 wherein the mercury salt is mercury (I) acetate or mercury (I) formate.

11. A process according to claim 2 wherein the sulfite ester is reacted with methanol, formic acid or acetic acid in the presence, as water-binding agent, of activated aluminumoxide or an isocyanate, a carbodiimide, carbonyl diimidazole, a carboxylic acid anhydride, an orthoformic acid ester, an enol ester or a ketene and in the presence of mercury acetate or mercury formate.

12. A process according to claim 3 wherein the mercury salt is mercury acetate or mercury formate.

* * * * *

UNITED STATES PATENT OFFICE
CERTIFICATE OF CORRECTION

Patent No. 3,764,615           Dated October 9, 1973

Inventor(s)   Helmut Hauser

It is certified that error appears in the above-identified patent and that said Letters Patent are hereby corrected as shown below:

On the cover sheet [73] Assignee: "Berlin, Germany" should read -- Berlin and Bergkamen, Germany --. Column 9, Claim 1, in the formula "C=CH" should read -- C≡CH --.

Signed and sealed this 27th day of August 1974.

(SEAL)
Attest:

McCOY M. GIBSON, JR.          C. MARSHALL DANN
Attesting Officer             Commissioner of Patents